US010950040B2

(12) United States Patent
Jones

(10) Patent No.: US 10,950,040 B2
(45) Date of Patent: Mar. 16, 2021

(54) LABELING FOR THREE-DIMENSIONAL OCCLUDED SHAPES

(71) Applicant: Google LLC, Mountain View, CA (US)

(72) Inventor: Jonah Jones, Bromley (GB)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/194,490

(22) Filed: Nov. 19, 2018

(65) Prior Publication Data

US 2019/0259203 A1 Aug. 22, 2019

Related U.S. Application Data

(63) Continuation of application No. 15/722,679, filed on Oct. 2, 2017, now Pat. No. 10,134,183, which is a continuation of application No. 14/580,291, filed on Dec. 23, 2014, now Pat. No. 9,779,544.

(51) Int. Cl.
*G06T 17/05* (2011.01)
*G06T 19/00* (2011.01)

(52) U.S. Cl.
CPC .............. *G06T 17/05* (2013.01); *G06T 19/00* (2013.01); *H05K 999/99* (2013.01); *G06T 2219/004* (2013.01)

(58) Field of Classification Search
None
See application file for complete search history.

(56) References Cited

U.S. PATENT DOCUMENTS

| 6,424,933 | B1 | 7/2002 | Agrawala et al. | |
|---|---|---|---|---|
| 8,483,447 | B1 | 7/2013 | Arfvidsson et al. | |
| 9,443,494 | B1* | 9/2016 | Parish | G09G 5/373 |
| 2004/0252137 | A1* | 12/2004 | Gelber | G06T 11/60 |
| | | | | 345/629 |
| 2009/0110267 | A1* | 4/2009 | Zakhor | G06T 15/04 |
| | | | | 382/154 |
| 2013/0321397 | A1 | 12/2013 | Chen et al. | |
| 2014/0049564 | A1 | 2/2014 | Boerger et al. | |
| 2014/0071119 | A1 | 3/2014 | Peimonte et al. | |
| 2014/0267257 | A1 | 9/2014 | Overbeck et al. | |
| 2014/0354629 | A1 | 12/2014 | Adlers et al. | |
| 2015/0342537 | A1* | 12/2015 | Taylor | A61B 5/026 |
| | | | | 600/508 |

OTHER PUBLICATIONS

Ali, et al., "Label Layout for Interactive 3D Illustrations", The Journal of WSCG, vol. 13, Jan. 31-Feb. 4, 2005, 8 pages.

(Continued)

*Primary Examiner* — Zhengxi Liu
(74) *Attorney, Agent, or Firm* — Dority & Manning, P.A.

(57) ABSTRACT

Systems and methods for displaying labels in conjunction with geographic imagery provided, for instance, by a geographic information system, such as a mapping service or a virtual globe application are provided. Candidate positions for displaying labels in conjunction with geographic imagery can be determined based at least in part on a virtual camera viewpoint. The candidate positions can be associated with non-occluded points on three-dimensional models corresponding to the labels. Adjusted positions for labels can be determined form the plurality of candidate positions. The labels can be provided for display in conjunction with the geographic imagery at the adjusted positions.

20 Claims, 6 Drawing Sheets

(56) References Cited

OTHER PUBLICATIONS

Bell, et al., "View Management for Virtual and Augmented Reality", Proceedings of the 14$^{th}$ Annual ACM Symposium on User Interface Software and Technology, Orlando, Florida, Nov. 11-14, 2001, 10 pages.

Vaaraniemi, et al., "Enhancing the Visibility of Labels in 3D Navigation Maps", Progress and New Trends in 3D Geoinformation Sciences, Springer Berlin Heidelberg, 2013, pp. 23-40.

\* cited by examiner

LABELING FOR THREE-DIMENSIONAL OCCLUDED SHAPES

CROSS-REFERENCE TO RELATED APPLICATIONS

This application is a continuation of U.S. patent application Ser. No. 15/722,679, filed on Oct. 2, 2017, which, in turn, is a continuation of U.S. patent application Ser. No. 14/580,291, filed on Dec. 23, 2014 and issued as U.S. Pat. No. 9,779,544, the disclosures of both of which are hereby incorporated by reference herein in their entirety for all purposes.

FIELD

The present disclosure relates generally to geographic information systems and more particularly, to providing labels in conjunction with the three-dimensional shapes in geographic imagery provided by geographic information systems.

BACKGROUND

Geographic information systems, such as a mapping service or virtual globe application, provide for the archiving, retrieving, and manipulating of data that has been stored and indexed according to geographic coordinates of its elements. Geographic information systems and other services can allow a user to view geographic imagery associated with an object or location of interest. For instance, a user may request imagery associated with a particular store, location, landmark, etc. The geographic information system can provide geographic imagery depicting the object or location of interest in response to the request to the user.

Geographic information systems can offer imagery of geographic regions of interest in a variety of different formats and from a variety of different view perspectives. For instance, geographic imagery can be provided as map imagery, satellite imagery, aerial imagery, interactive panoramic imagery presented from a perspective at or near ground level, and other imagery. Some geographic information systems provide a user interface with navigation controls for navigating cities, neighborhoods, geographic areas and other terrain in two or three dimensions. The navigation controls can enable users to tilt, pan, rotate, zoom, and activate a virtual camera to obtain views of terrain, buildings, and other objects from different perspectives at a geographic area of interest.

Geographic information systems can provide labels associated with various points of interest for display in conjunction with geographic imagery. In many cases, the labels can be rendered at positions in the geographic imagery corresponding to the geographic location of the points of interest with which the labels are associated.

SUMMARY

Aspects and advantages of embodiments of the present disclosure will be set forth in part in the following description, or may be learned from the description, or may be learned through practice of the embodiments.

One example aspect of the present disclosure is directed to a method of displaying imagery of a geographic area. The method can include receiving, by one or more computing devices, data indicative of a request to view geographic imagery of a geographic area from a virtual camera viewpoint and accessing, by the one or more computing devices, a label for each of two or more points of interest. Each label can be associated with an initial position in the geographic imagery. The method can further include identifying, by the one or more computing devices, a plurality of candidate positions for each label based at least in part on the virtual camera viewpoint. Each of the plurality of candidate positions can be associated with a non-occluded point on a three-dimensional model corresponding to a geographic location of the point of interest associated with the label. The method can further include determining, by the one or more computing devices, an adjusted position for each label from the plurality of candidate positions and providing for display, by the one or more computing devices, each label at the adjusted position in the geographic imagery from the virtual camera viewpoint.

Other example aspects of the present disclosure are directed to systems, apparatus, tangible, non-transitory computer-readable media, user interfaces, memory devices, and electronic devices for displaying imagery of a geographic area.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
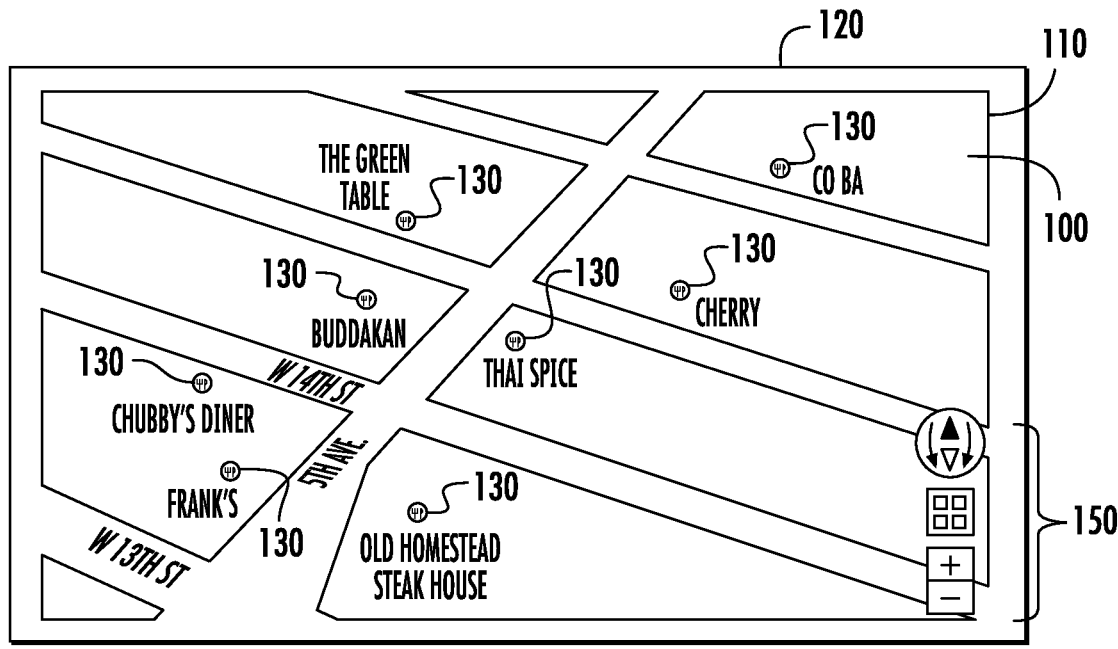
FIG. 1 depicts the example display of labels associated with points of interest in conjunction with two-dimensional geographic imagery.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Overview

Example aspects of the present disclosure are directed to systems and methods for displaying labels in conjunction with geographic imagery provided, for instance, by a geographic information system, such as a mapping service or a virtual globe application. Geographic information systems can provide labels associated with various points of interest for display in conjunction with geographic imagery. In many cases, the labels can be rendered at positions in the geographic imagery corresponding to the geographic location of the points of interest with which the labels are associated.

For instance, FIG. 1 depicts example geographic imagery 100 presented on a display 110 of a computing device 120, such as a smartphone, tablet, laptop, desktop, wearable computing device, display with one or more processors, or other computing device. The geographic imagery 100 is two-dimensional cartographic imagery (e.g. map imagery) that views a geographic area from an oblique perspective. The geographic imagery 100 includes various labels 130 (e.g. text annotations) for various points of interest. The labels 130 can provide information concerning the points of interest, such as the text providing names of the points of interest. The labels 130 can also include indicia to signify the category of the point of interest. For instance, the labels 130 can include a knife/fork symbol to signify that the points of interest are restaurants. The labels 130 can be rendered at default or initial positions at or near the location of the point of interest with which the label is associated in the geographic area. A user can interact with the labels 130 (e.g. by clicking or tapping) to obtain more information about the point of interest.

In geographic imagery having three-dimensional features, such as three-dimensional models of buildings, the labels can be occluded by three-dimensional shapes located in front of the labels. This can be addressed by making these labels invisible. However, making the labels invisible can make it difficult or impossible for users to gain information from the labels or to interact with the labels to obtain more information from the geographic information system. Another solution can include letting the labels float in front of the three-dimensional features. However, this can undermine the illusion of viewing a solid three-dimensional world and can create confusion over the actual location of the points of interest associated with the labels.

Figure 2:
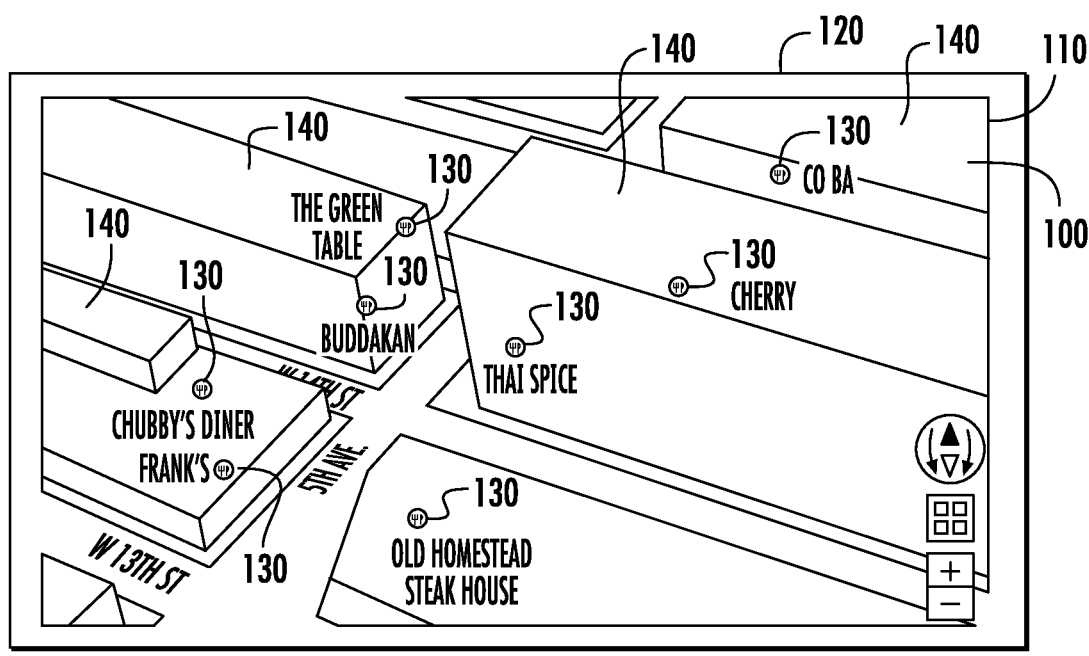
FIG. 2 depicts the example display of labels associated with points of interest in conjunction with geographic imagery having three-dimensional models of buildings.

For example, FIG. 2 depicts the geographic imagery 100 of FIG. 1 with three-dimensional models 140 of buildings depicted in the imagery 100. The three-dimensional models 140 can include vector representations of the buildings associated with points of interest in the imagery 100. Other three-dimensional models can also be used, such as stereo reconstructions generated from, for instance, aerial imagery of the geographic area captured by a camera from an aircraft. As shown in FIG. 2, when the labels 130 are rendered at their initial or default positions, it can be difficult to determine the location of the point of interest. For instance, it can be ambiguous as to whether the point of interest associated with the label "Cherry" is in the same building as the point of interest associated with the label "Thai Spice."

According to example aspects of the present disclosure, candidate positions for displaying labels in conjunction with geographic imagery can be determined based at least in part on the virtual camera viewpoint or perspective viewing the geographic imagery to maintain visibility of the labels in a three-dimensional environment. As used herein, a virtual camera viewpoint refers to the perspective from which the geographic imagery is viewed when displaying the geographic imagery in a user interface. A virtual camera viewpoint can be associated with various parameters, such as distance to the geographic imagery (e.g. zoom level) as well as view angle relative to the geographic imagery.

In example embodiments, a plurality of non-occluded candidate positions can be determined for a label based on the virtual camera viewpoint viewing the imagery. The label can be displayed at one of the plurality of non-occluded candidate positions. If there are no non-occluded positions available for the label, the label can be rendered with indicia indicative of occlusion. For instance, the label can be greyed out to indicate that the location of the label is occluded. In this way, more labels can be displayed in conjunction with the geographic imagery with less occlusion, resulting in labels maintaining visibility and interactivity. In addition, the labels can be displayed in a manner that does not undermine the three-dimensional environment or create confusion as to the actual location of the points of interest associated with the labels.

More particularly, data indicative of a request to view geographic imagery of a geographic area from a virtual camera viewpoint can be received. A plurality of candidate positions for displaying the label can be determined based on the virtual camera viewpoint. The plurality of candidate positions can be determined based at least in part on the virtual camera viewpoint by identifying non-occluded points on a three-dimensional model associated with the point of interest corresponding to the label. For instance, a three-dimensional model of a feature (e.g. a building) associated with the point of interest corresponding to the label can be accessed. A plurality of candidate points along the three-dimensional model can be identified. For instance, a candidate point can be identified on the top surface and the bottom surface for each side of the three-dimensional model. It can be determined which candidate points are non-occluded based on the virtual camera viewpoint. The non-occluded candidate points can be identified as the candidate positions for the label.

The position for displaying the label can be determined based at least in part on a distance between an initial position of the label and each of the candidate positions. For instance, the position for displaying the label can be determined as the closest candidate position relative to the default position. Once the position for the second label has been determined, the label can be provided for display in conjunction with the geographic area at the determined position.

For example, a user can request to view cartographic imagery of a city block from the perspective of a virtual camera viewpoint (e.g. at an oblique angle along the North direction). The cartographic imagery can include various three-dimensional models representative of buildings in the city block. Labels (e.g. Joe's Café) associated with various points of interest can be rendered in conjunction with the three-dimensional representations of the buildings by identifying various non-occluded candidate positions on the three-dimensional models of the buildings based at least in part on the virtual camera viewpoint. The closest candidate positions for each label can be identified as the position for the label. In this way, the labels can be rendered in a manner that preserves the three-dimensional environment associated with the geographic imagery.

Example Methods for Displaying Labels in Conjunction with Geographic Imagery

Figure 3:
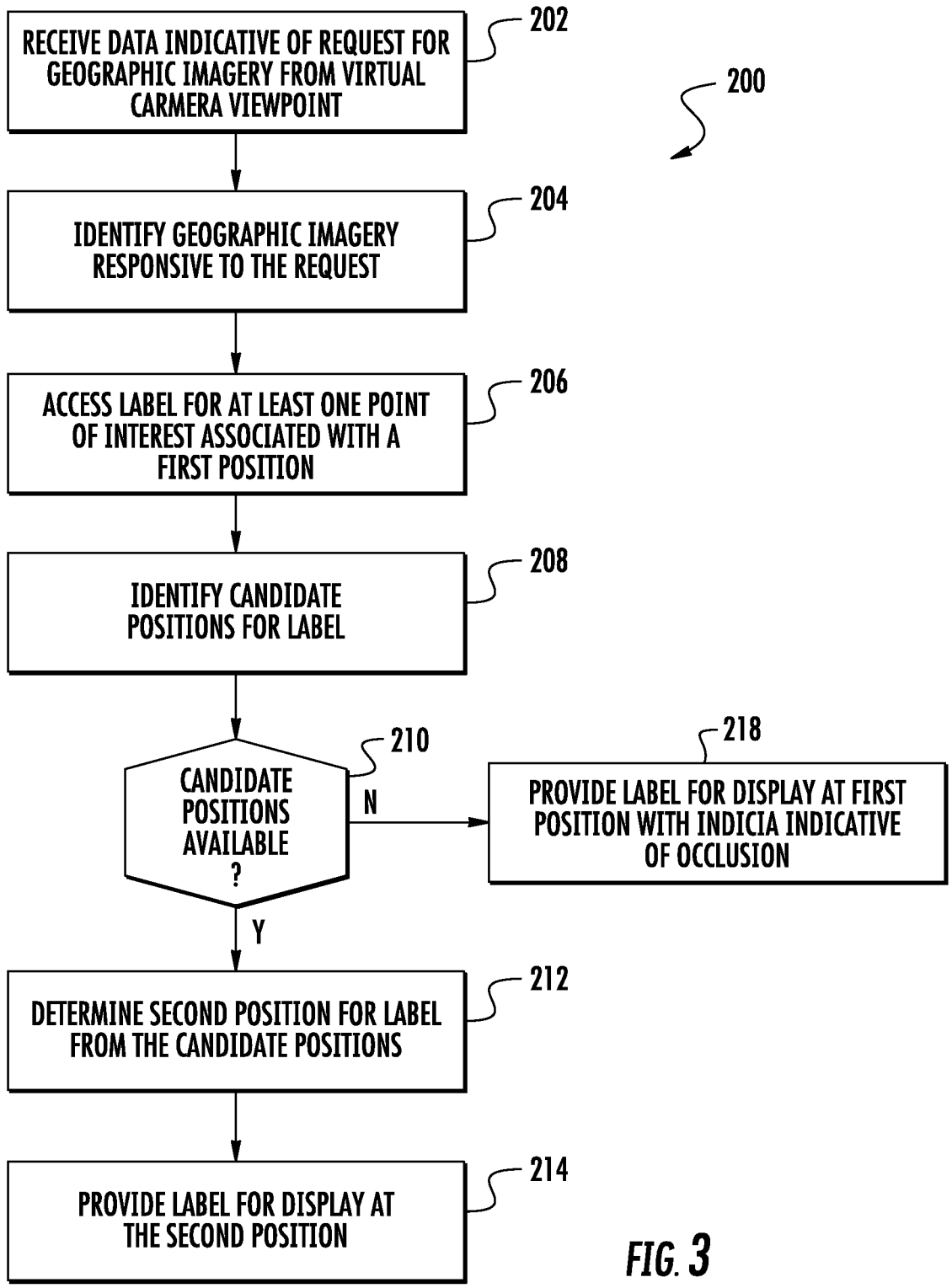
FIG. 3 depicts a flow diagram of an example method for displaying labels in conjunction with geographic imagery according to example embodiments of the present disclosure.

FIG. 3 depicts a flow diagram of an example method (200) for displaying labels in conjunction with geographic imagery according to example embodiments of the present disclosure. The method (200) can be implemented by one or more computing devices, such as one or more of the computing devices depicted in FIG. 10. In addition, FIG. 3 depicts steps performed in a particular order for purposes of illustration and discussion. Those of ordinary skill in the art, using the disclosures provided herein, will understand that the steps of any of the methods disclosed herein can be modified, adapted, expanded, omitted, and/or rearranged in various ways without deviating from the scope of the present disclosure.

At (202), the method can include receiving data indicative of a request for geographic imagery. For instance, a user interacting with a user interface associated with a geographic information system (e.g. a browser or other application) can request geographic imagery of a geographic imagery of interest. The geographic imagery can include cartographic imagery (e.g. map imagery), satellite imagery, aerial imagery, panoramic imagery, or other suitable imagery depicting the geographic area.

The data indicative of the request can include data associated with a particular virtual camera viewpoint. More particularly, many geographic information systems can include user controls for zooming, panning, tilting, and otherwise navigating a virtual camera to view geographic imagery from different virtual camera viewpoint. For instance, referring to the example shown in FIG. 1, a user interface for navigating geographic imagery can include various control tools 150 that allow a user to pan, tilt, rotate, and zoom the geographic imagery. Data indicative of a request to view geographic imagery from a particular virtual camera perspective can include data indicative of user interactions with the various control tools 150.

At (204) of FIG. 3, geographic imagery responsive to the request can be identified for display. More particularly, geographic imagery can be identified and rendered from the perspective of a particular virtual camera viewpoint in response to receiving the data indicative of the request. In the example of FIG. 2, geographic imagery 100 can be displayed viewing geographic imagery from a particular virtual camera viewpoint. The geographic imagery 100 can provide a three-dimensional representation of the geographic area. For instance, as shown in FIG. 2, the geographic imagery 100 can include three-dimensional representations 140 of buildings in the geographic area.

At (206) of FIG. 3, the method can include accessing labels for rendering in conjunction with one or more points of interest in the geographic area. The labels can be identified based at least in part on data accessed or received from a geographic information database storing information about points of interest in the geographic area. As discussed with reference to FIG. 1, the labels can include text annotations describing and/or naming the point of interest as well as symbols or other indicia signifying a category of the point of interest. The data for the labels can be associated with an initial or first position for rendering in conjunction with the geographic information. The initial or first position can be determined based at least in part on the location of the point of interest with which the label is associated.

At (208), the method can include identifying candidate positions for each identified label. The candidate positions for each label can be non-occluded points in the geographic imagery for rendering the label. A non-occluded point refers to a point that is not occluded by a three-dimensional structure when rendered from the virtual camera viewpoint.

Figure 4:
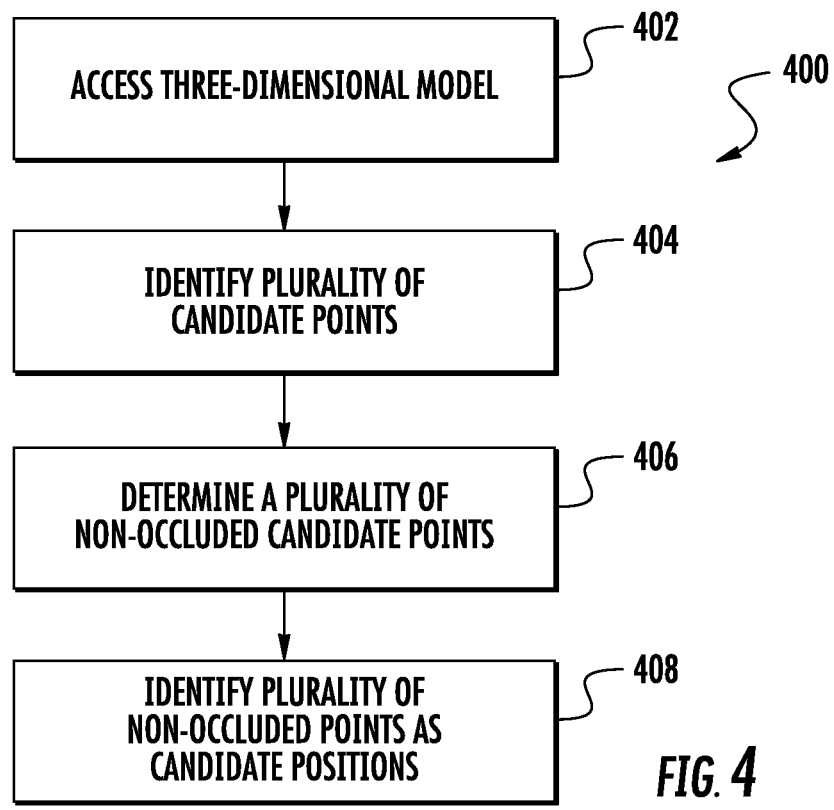
FIG. 4 depicts a flow diagram of an example method for identifying candidate positions for labels according to example embodiments of the present disclosure.

FIG. 4 depicts a flow diagram of one example method (400) for identifying candidate positions for a label according to example aspects of the present disclosure. At (402), a three-dimensional model associated with the point of interest corresponding to the label can be accessed. For instance, if the data associated with a label indicates the label corresponds to a point of interest located in a particular building, data associated with a three-dimensional model of the building can be accessed.

Figure 5:
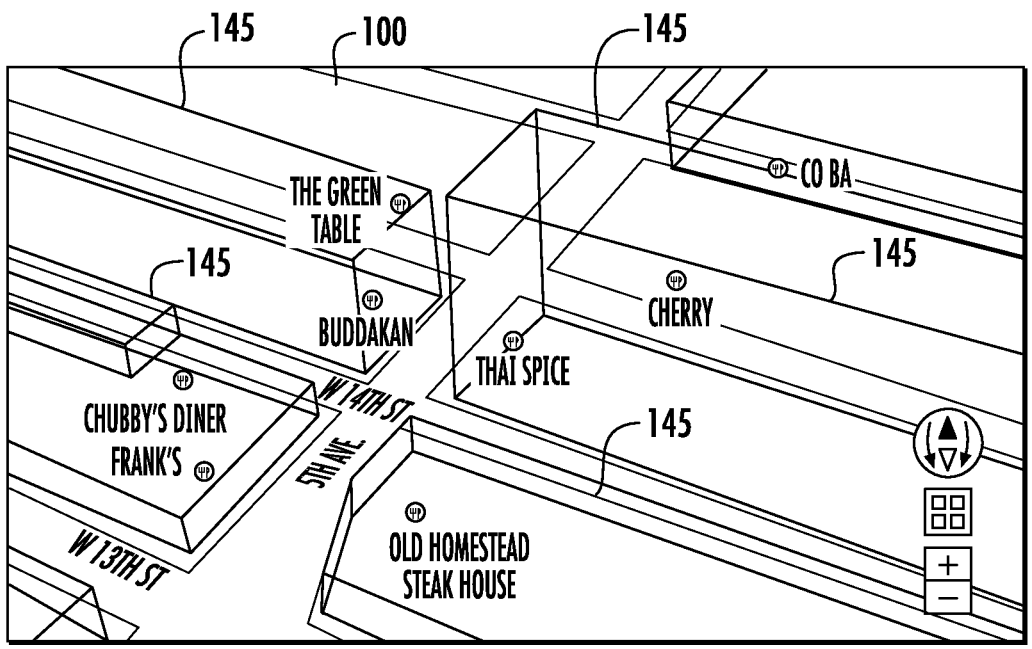
FIG. 5 depicts an example display of wireframe representations of three-dimensional models.

The data associated with the three-dimensional model can include data sufficient for rendering the three-dimensional model in conjunction with the geographic imagery. In particular implementations, the data associated with the three-dimensional model can include a wireframe representation of the three-dimensional model. For instance, FIG. 5 depicts example wireframe representations 145 for buildings to be rendered in conjunction with geographic imagery 100. The wireframe representations 145 can include data indicative of the external surfaces of the three-dimensional model and more particularly data indicative of the intersection of the external surface of the three-dimensional model.

At (404) of FIG. 4, a plurality of candidate points for rendering the label on the three-dimensional model can be identified. The plurality of candidate points can be a subset of points located on the three-dimensional model. The plurality of candidate points can be determined in any suitable manner. For instance, a select number of points on selected surfaces of the three-dimensional model can be identified as candidate points. In one example embodiment, at least one point on a top surface for each side of the three-dimensional model and at least one point on a bottom surface for each side of the three-dimensional model can be identified based at least in part on the wireframe representation.

Figure 6:
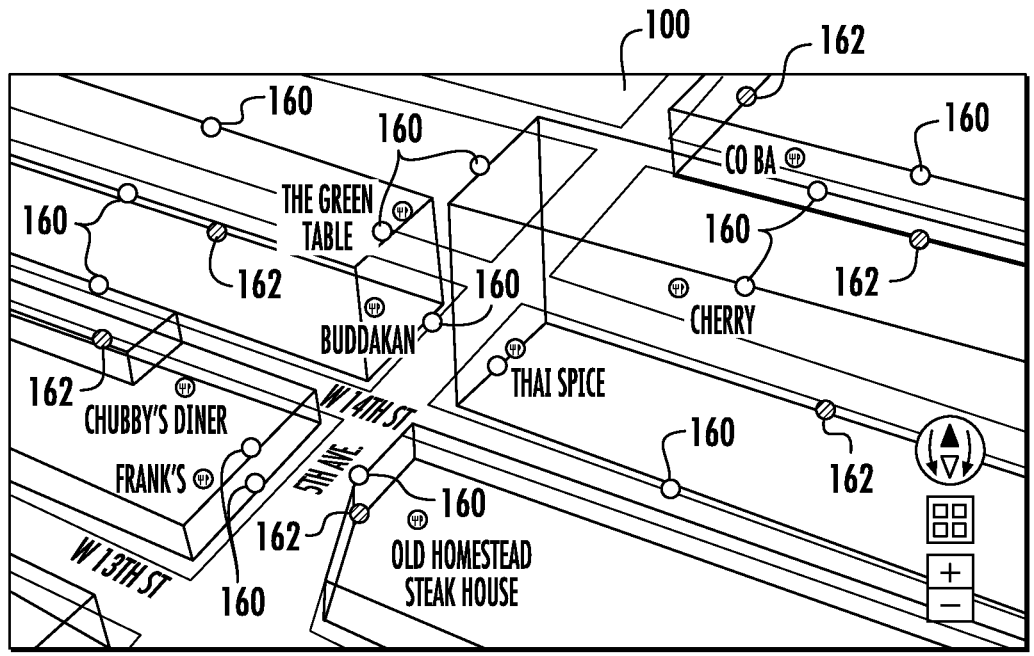
FIG. 6 depicts an example identification of candidate positions for labels according to example embodiments of the present disclosure.

FIG. 6 depicts the example identification of candidate points for a three-dimensional model. More particularly, candidate points 160, 162 can be identified based on the virtual camera viewpoint. The candidate points 160, 162 include points roughly in the center of the top surface and bottom surface for each side of the three-dimensional models. Other points located on the three-dimensional models can be selected as candidate points without deviating from the scope of the present disclosure.

At (406) of FIG. 4, non-occluded candidate points are identified from the plurality of candidate points. The non-occluded candidate points can be identified based at least in part on the virtual camera viewpoint. For instance, a candidate point can be classified as a non-occluded candidate point if it is determined that there is a direct line of sight between the virtual camera viewpoint and the candidate point. A direct line of sight can mean that there are no significant occlusions resulting from three dimensional models of objects to be rendered in the geographic imagery in a path from the virtual camera viewpoint to the candidate point.

For instance, referring to FIG. 6, candidate points 160 are non-shaded to indicate that the candidate points 160 are non-occluded candidate points. For instance, there are no significant occlusions in a line of sight between the virtual camera viewpoint and the candidate points 160. Candidate points 162 are shaded to indicate that they are occluded candidate points. Occluded candidate points 162 can have one or more objects occluding the view of the candidate points when viewed from the virtual camera perspective in the geographic imagery 100.

At (408) of FIG. 4, the non-occluded candidate points can be identified as candidate positions for the label. For instance, referring to FIG. 6, candidate points 160 can be identified as candidate positions for the label. Candidate points 162, which are occluded candidate points, are not identified as candidate positions for the label.

Referring back to FIG. 2 at (210), it is determined whether candidate positions are available for the label. As discussed with reference to FIG. 4, candidate positions are identified based on non-occluded candidate points. In some circumstances, a label may have no possible non-occluded points for rendering the label. If no non-occluded points are available for rendering the label, there may be no candidate positions available. For instance, as shown in FIGS. 7 and 8, it can be determined that no candidate positions are available for the label "Cherry" and the label "The Green Table."

Figure 9:
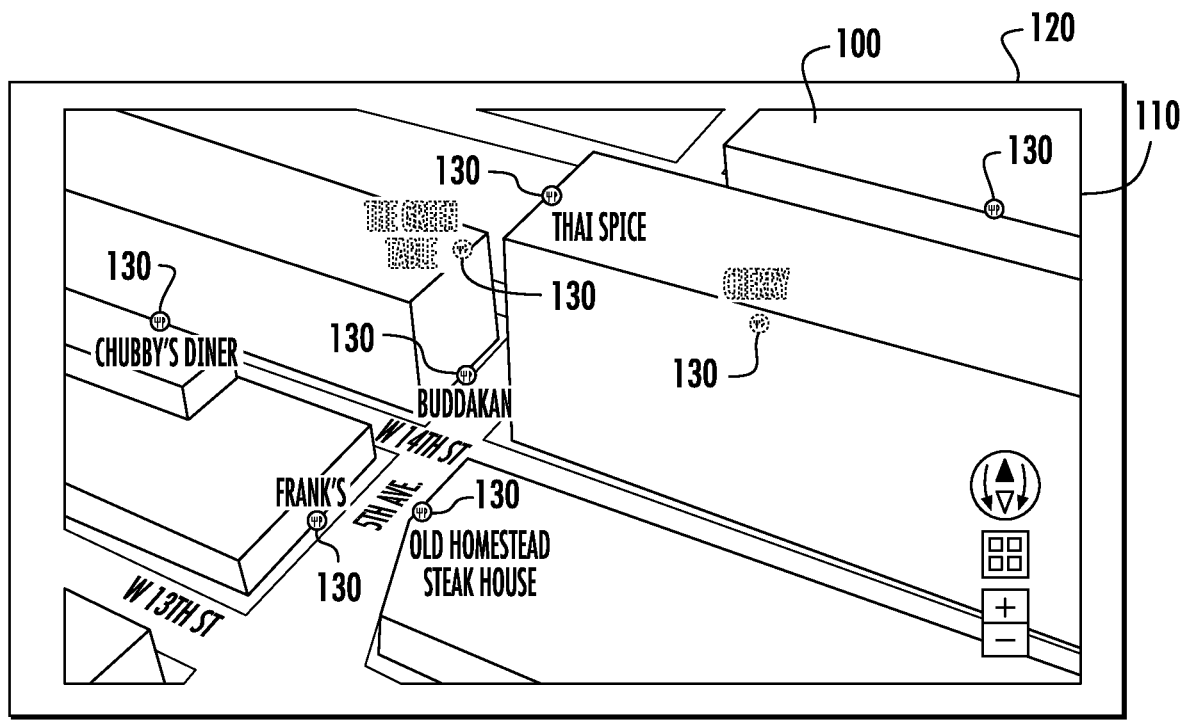
FIG. 9 depicts example geographic imagery including labels at positions determined according to example aspects of the present disclosure.

In the event that no candidate positions are available for rendering the label, the method (200) can include providing for display the label at the initial or default position with indicia indicative of occlusion (212). The indicia indicative of occlusion can include graying out the label or other indicia indicating that the label is occluded. For instance, as shown in FIG. 9, the label "Cherry" and the label "The Green Table" can be greyed out to signify that the label is occluded. Other suitable indicia indicative of occlusion (e.g. transparency, text, symbols, etc.) can be used without deviating from the present disclosure.

When candidate positions are available, the method (200) of FIG. 2 can include determining a second or adjusted position for the label from the plurality of candidate positions. In particular implementations, the adjusted position for the label can be determined based on a distance between the initial position of the label and each of the plurality of candidate positions for the label. For instance, the adjusted position can be determined as the closest candidate position to the initial position for the label.

Figure 7:
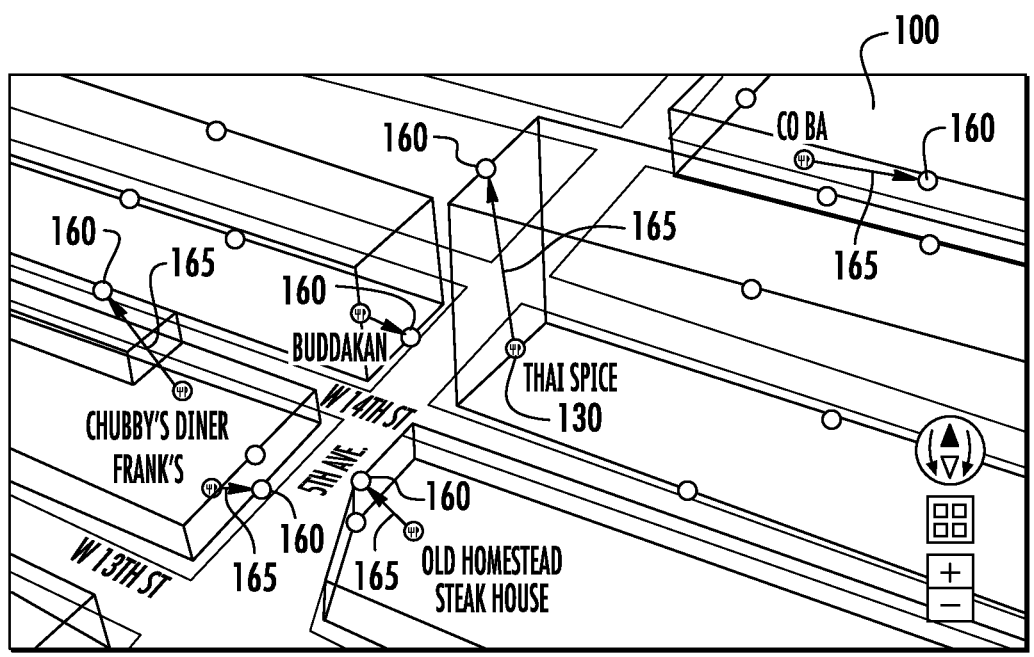
FIG. 7 depicts an example identification of adjusted positions for labels from a plurality of candidate positions according to example embodiments of the present disclosure.
Figure 8:
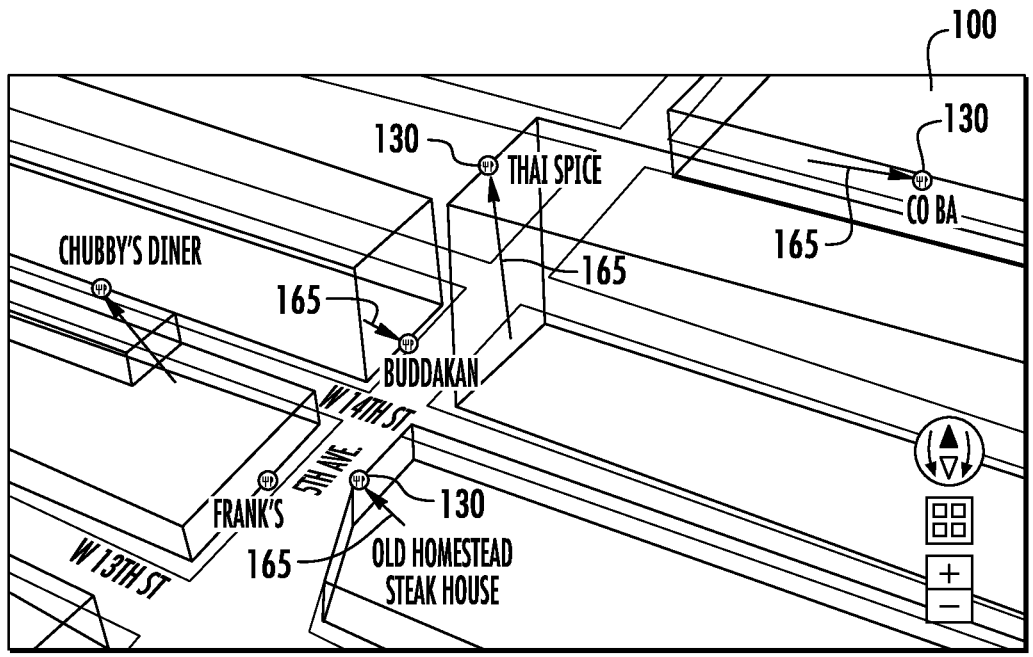
FIG. 8 depicts the example adjusted positions of labels determined according to example aspects of the present disclosure.

FIGS. 7 and 8 depict the example determination of the adjusted position for each label. More particularly, as shown in FIG. 7, arrows 165 depict the selection of candidate positions 160 closest to the initial positions of the labels 130 as adjusted positions. FIG. 8 depicts the actual adjustment of the label from the initial positions to the adjusted positions.

At (214) of FIG. 2, the labels are provided for display in conjunction with the geographic imagery at the second or adjusted positions. FIG. 9 depicts the example display of geographic imagery 100 on a display device 110 of a computing device 120 with label positions determined according to example aspects of the present disclosure. As shown, the labels 130 are provided for display at candidate positions determined based at least in part on a virtual camera viewpoint for the viewing the geographic imagery 100. The labels "Cherry" and "The Green Table" are greyed out to signify that no non-occluded positions for rendering the labels were identified.

Example Systems for Rendering Geographic Imagery

Figure 10:
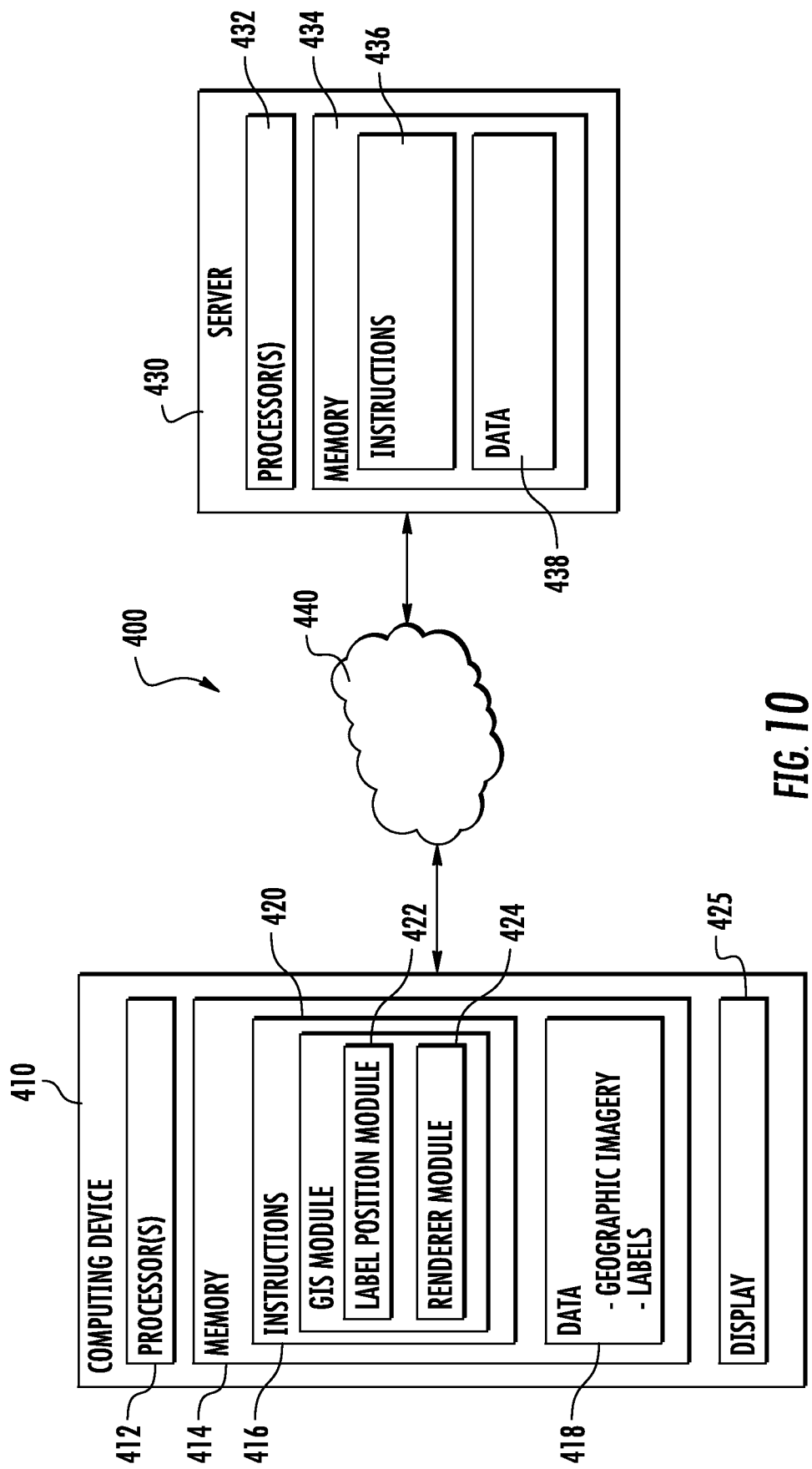
FIG. 10 depicts an example system for displaying labels in conjunction with geographic imagery according to example embodiments of the present disclosure.

FIG. 10 depicts a computing system 400 that can be used to implement the methods and systems for displaying imagery of geographic areas according to example embodiments of the present disclosure. The system 400 can be implemented using a client-server architecture that includes a computing device 410 that can communicate with one or more servers 430 (e.g. web servers) over a network 440. The system 400 can be implemented using other suitable architectures, such as a single computing device.

The system can include a computing device 410. The computing device 410 can be any suitable type of computing device, such as a general purpose computer, special purpose computer, navigation system (e.g. an automobile navigation system), laptop, desktop, mobile device, smartphone, tablet, wearable computing device, a display with one or more processors, or other suitable computing device. The computing device 410 can include one or more processor(s) 412 and one or more memory devices 414.

The one or more processor(s) 412 can include any suitable processing device, such as a microprocessor, microcontroller, integrated circuit, logic device, one or more central processing units (CPUs), graphics processing units (GPUs) dedicated to efficiently rendering images or performing other specialized calculations, and/or other processing devices. The one or more memory devices 414 can include one or more computer-readable media, including, but not limited to, non-transitory computer-readable media, RAM, ROM, hard drives, flash drives, or other memory devices.

The one or more memory devices 414 store information accessible by the one or more processors 412, including instructions 416 that can be executed by the one or more processors 412. For instance, the memory devices 414 can store instructions 416 for implementing a geographic information system (GIS) module 420 configured to allow a user to interact with a geographic information system hosted, for instance, by the server 430. The GIS module 420 can implement a label position module 422 configured to determine the positions of labels to be rendered in conjunction with geographic imagery according to one or more aspects of the example embodiments of the present disclosure. The GIS module 420 can also include a renderer module 424 configured to render geographic imagery and labels in conjunction with geographic imagery at positions determined by the label position module 422.

It will be appreciated that the term "module" refers to computer logic utilized to provide desired functionality. Thus, a module can be implemented in hardware, application specific circuits, firmware and/or software controlling a general purpose processor. In one embodiment, the modules are program code files stored on the storage device, loaded into one or more memory devices and executed by one or more processors or can be provided from computer program products, for example computer executable instructions, that are stored in a tangible computer-readable storage medium such as RAM, flash drive, hard disk or optical or magnetic media. When software is used, any suitable programming language or platform can be used to implement the module.

The one or more memory devices 414 can also include data 418 that can be retrieved, manipulated, created, or stored by the one or more processors 412. The data 418 can include, for instance, geographic imagery, labels, data access from a geographic information system hosted by server 430, and other data.

The computing device 410 can include various input/output devices for providing and receiving information from a user, such as a touch screen, touch pad, data entry keys, speakers, and/or a microphone suitable for voice recognition. For instance, the computing device 410 can have a display device 425 for providing imagery of a geographic area to a user.

The computing device 410 can also include a network interface used to communicate with one or more remote computing devices (e.g. server 430) over the network 440. The network interface can include any suitable components for interfacing with one more networks, including for example, transmitters, receivers, ports, controllers, antennas, or other suitable components.

The system 400 includes a server 430, such as a web server. The server 430 can host or be in communication with a geographic information system. The server 430 can be implemented using any suitable computing device(s). The server 430 can have one or more processors 432 and memory 434. The memory 434 can store instructions 436 and data 438. The server 430 can also include a network interface used to communicate with computing device 410 over the network 440. The network interface can include any suitable components for interfacing with one more networks, including for example, transmitters, receivers, ports, controllers, antennas, or other suitable components.

The network 440 can be any type of communications network, such as a local area network (e.g. intranet), wide area network (e.g. Internet), cellular network, or some combination thereof. The network 440 can also include a direct connection between a computing device 410 and the server 430. In general, communication between the server 430 and a computing device 410 can be carried via network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for displaying a label in a three-dimensional view of a geographic area, the method comprising:

identifying, by a computing system comprising one or more computing devices, geographic imagery of the geographic area from a perspective of a virtual camera viewpoint, wherein the geographic imagery comprises a wireframe representation of external surfaces of one or more three-dimensional models;

identifying, by the computing system, a label for a point of interest associated with a geographic location within the geographic area, wherein the label is associated with an initial position for rendering in conjunction with the three-dimensional models of the geographic imagery, and wherein the label is occluded by at least one of the one or more three-dimensional models within the geographic imagery at the initial position;

determining, by the computing system, one or more candidate points on a top side and a bottom side in the center of each side of the one or more three-dimensional models respectively, wherein the one or more candidate points are based at least in part on the wireframe representation and the initial position associated with the label, wherein each of the one or more candidate points correspond to a respective position within the geographic imagery;

identifying, by the computing system, one or more non-occluded candidate points from the one or more candidate points based at least in part on the virtual camera viewpoint and the one or more three-dimensional models of the geographic imagery, wherein candidate positions for the label are associated with the one or more nonoccluded candidate points;

determining, by the computing system, a second position for the label corresponding to at least one of the one or more nonoccluded candidate points, wherein the second position is the candidate position that is closest to the initial position and different from the initial position; and displaying, by the computing system, the label at the second position corresponding to the at least one of the one or more nonoccluded candidate points in the three-dimensional view of the geographic area from the perspective of the virtual camera viewpoint.

2. The computer-implemented method of claim 1, further comprising:

receiving, by the computing system, data indicative of a request to view the geographic imagery of the geographic area from the perspective of the virtual camera view point; and in response to receiving the request, identifying, by the computing system, data indicative of the geographic imagery of the geographic area from the perspective of the virtual camera viewpoint.

3. The computer-implemented method of claim 1, wherein the initial position associated with the label corresponds to the geographic location of the point of interest.

4. The computer-implemented method of claim 1, wherein displaying, by the computing system, the label at the second position corresponding to the at least one of the one or more nonoccluded candidate points in the three-dimensional view of the geographic area from the perspective of the virtual camera viewpoint comprises:

rendering, by the computing system, the one or more three-dimensional models of the geographic imagery; and displaying, by the computing system, the label at the second position in conjunction with the one or more three-dimensional models of the geographic imagery.

5. The computer-implemented method of claim 1, wherein each of the one or more candidate points are associated with at least one of the one or more three-dimensional models of the geographic imagery.

6. The computer-implemented method of claim 5, wherein determining, by the computing system, the one or more candidate points based at least in part on the initial position associated with the label comprises:
identifying, by the computing system, one or more candidate points on a top surface or a bottom surface of a three-dimensional model associated with the initial position of the label.

7. The computer-implemented method of claim 1, wherein identifying, by the computing system, the one or more nonoccluded candidate points from the one or more candidate points based at least in part on the virtual camera viewpoint and the one or more three-dimensional models of the geographic imagery comprises:
determining, by the computing system, that there is a direct line of sight between the virtual camera viewpoint and each of the one or more nonoccluded candidate points.

8. The computer-implemented method of claim 1, wherein determining, by the computing system, the second position for the label corresponding to at least one of the one or more nonoccluded candidate points comprises:
determining, by the computing system, the second position for the label based at least in part on a distance between the initial position of the label and the respective position associated with each of the one or more of candidate points.

9. The computer-implemented method of claim 1, wherein the one or more three-dimensional models are representative of one or more buildings.

10. A computer-implemented method for displaying a label in a three-dimensional view of a geographic area, the method comprising:
identifying, by a computing system comprising one or more computing devices, geographic imagery of the geographic area from a perspective of a virtual camera viewpoint, wherein the geographic imagery comprises a wireframe representation of external surfaces of one or more three-dimensional models;
identifying, by the computing system, a label for a point of interest associated with a geographic location within the geographic area, wherein the label is associated with an initial position for rendering in conjunction with the three-dimensional models of the geographic imagery, and wherein the label is occluded by at least one of the one or more three-dimensional models within the geographic imagery at the initial position;
determining, by the computing system, one or more candidate points on a top side and a bottom side in the center of each side of the one or more three-dimensional models respectively, wherein the one or more candidate points are based at least in part on the wireframe representation and the initial position associated with the label, wherein each of the one or more candidate points correspond to a respective position within the geographic imagery;
determining, by the computing system, that each of the one or more candidate points correspond to a respective position within the geographic imagery that is occluded from the perspective of the virtual camera viewpoint by at least one of the one or more three-dimensional models of the geographic imagery; and
displaying, by the computing system, the label at the initial position within the three-dimensional view of the geographic imagery from the perspective of the virtual camera viewpoint, wherein the label is displayed with an indicia indicative of occlusion comprising at least one symbol indicative of occlusion and a category of the point of interest.

11. The computer-implemented method of claim 10, wherein the indicia indicative of occlusion further comprises at least one of a difference in transparency, or text associated with the label.

12. A computing device, comprising:
one or more processors; and
one or more memory devices, the one or more memory devices storing instructions that when executed by the one or more processors cause the one or more processors to perform operations, the operations comprising:
identifying geographic imagery of a geographic area from a perspective of a virtual camera viewpoint, wherein the geographic imagery comprises a wireframe representation of external surfaces of one or more three-dimensional models;
identifying a label for a point of interest associated with a geographic location within the geographic area, wherein the label is associated wherein the label is associated with an initial position for rendering in conjunction with the three-dimensional models of the geographic imagery, and wherein the label is occluded by at least one of the one or more three-dimensional models within the geographic imagery at the initial position;
determining one or more candidate points on a top side and a bottom side in the center of each side of the one or more three-dimensional models respectively, wherein the one or more candidate points are based at least in part on the wireframe representation and the initial position associated with the label, wherein each of the one or more candidate points correspond to a respective position within the geographic imagery;
identifying one or more nonoccluded candidate points based at least in part on the virtual camera viewpoint and the one or more three-dimensional models of the geographic imagery, wherein candidate positions for the label are associated with the one or more nonoccluded candidate points;
determining a second position for the label corresponding to at least one of the one or more nonoccluded candidate points, wherein the second position is the candidate position that is closest to the initial position and different from the initial position; and
displaying the label at the second position corresponding to the at least one of the one or more nonoccluded candidate points in a three-dimensional view of the geographic imagery from the perspective of the virtual camera viewpoint.

13. The computing device of claim 12, further comprising:
receiving a request to view the geographic imagery of the geographic area from the perspective of the virtual camera viewpoint; and
in response to receiving the request, identifying data indicative of the geographic imagery of the geographic area from the perspective of the virtual camera viewpoint.

14. The computing device of claim 12, wherein the label is received from a geographic information database storing information about points of interest.

15. The computing device of claim 12, wherein identifying the one or more nonoccluded candidate points from the one or more candidate points based at least in part on the virtual camera viewpoint and the one or more three-dimensional models of the geographic imagery comprises:
   determining that there is a direct line of sight between the virtual camera viewpoint and each of the one or more nonoccluded candidate points.

16. The computing device of claim 12, wherein the geographic imagery comprises at least one of cartographic imagery, satellite imagery, aerial imagery, or panoramic imagery depicting a geographic area.

17. The computing device of claim 12, wherein the label comprises text annotations, symbols, or other indicia associated with the point of interest.

18. The computing device of claim 12, wherein displaying the label at the second position corresponding to the at least one of the one or more nonoccluded candidate points in the three-dimensional view of the geographic imagery from the virtual camera viewpoint comprises:
   rendering the one or more three-dimensional models of the geographic imagery; and
   displaying the label at the second position in conjunction with the one or more three-dimensional models of the geographic imagery.

19. The computing device of claim 12, wherein the one or more three-dimensional models are representative of one or more buildings.

20. The computing device of claim 12, wherein determining the second position for the label corresponding to at least one of the one or more nonoccluded candidate points comprises:
   determining the second position for the label based at least in part on a distance between the initial position of the label and the respective position associated with each of the one or more of candidate points.

* * * * *